United States Patent

Greenberg et al.

[15] 3,642,583
[45] Feb. 15, 1972

[54] TREATMENT OF SEWAGE AND OTHER CONTAMINATED LIQUIDS WITH RECOVERY OF WATER BY DISTILLATION AND OXIDATION

[72] Inventors: Jacob Greenberg, Ventnor City, N.J.; Douglas C. Whitaker, Wyncote, Pa.

[73] Assignee: Anti-Pollution Systems, Inc., Pleasantville, N.J.

[22] Filed: Aug. 3, 1970

[21] Appl. No.: 60,270

[52] U.S. Cl. ..................203/11, 203/31, 203/49, 203/88, 203/100, 203/DIG. 5, 203/DIG. 17, 159/1 R, 159/16 A, 202/234, 210/63, 210/71, 110/8 R
[51] Int. Cl. ........................................B01d 3/06
[58] Field of Search ..................165/110 X, 111 X; 110/8 R; 203/DIG. 5, DIG. 17, 100, 49, 10, 11, 88, 31, 29; 202/234; 210/12, 71, 63, 50, 51, 56, 15, 16; 159/1 R, 16 A

[56] References Cited

UNITED STATES PATENTS

| | | | |
|---|---|---|---|
| 2,897,150 | 7/1959 | Bencowitz | 210/63 |
| 3,032,482 | 5/1962 | Shoemaker | 203/100 |
| 3,127,243 | 3/1964 | Konikoff | 210/63 |
| 3,167,506 | 1/1965 | Fackler et al. | 210/63 |
| 3,344,042 | 9/1967 | Hardesty | 203/100 |
| 3,359,200 | 12/1967 | Gitchel et al. | 210/63 |
| 3,402,753 | 9/1968 | Thomas | 203/100 |
| 3,441,075 | 4/1969 | Wildi et al. | 203/100 |
| 3,442,802 | 5/1969 | Hamilton et al. | 210/71 X |
| 3,480,513 | 1/1969 | Martin | 203/100 |
| 3,522,151 | 7/1970 | Dismore | 203/49 |
| 3,361,648 | 1/1968 | Brown et al. | 203/22 |
| 3,487,016 | 12/1969 | Zeff | 203/10 |

*Primary Examiner*—Wilbur L. Bascomb, Jr.
*Attorney*—Paul & Paul

[57] ABSTRACT

In a process for distillation of water and combustion of waste and other contaminants in liquids, the contaminated liquid is introduced onto the surface of a molten salt bath which acts as an efficient heat transfer mechanism for producing flash distillation of the water and as a catalyst in promoting efficient oxidation of the organic contaminants. In one form, the salt bath may be a mixture of neutral salts; in another form, the salt bath contains a chemical oxidizer which continuously releases nascent oxygen and retakes ambient oxygen, thereby maintaining an equilibrium pressure of oxygen gas which aids the oxidation process. Where the liquid contains only salty residues, the water is evaporated off while the salt residue remains and adds to the molten bath without impairment of the heat transfer capability of the bath.

16 Claims, 3 Drawing Figures

PATENTED FEB 15 1972      3,642,583

INVENTORS.
Jacob Greenberg
Douglas C. Whitaker
BY Paul & Paul
ATTORNEYS.

TREATMENT OF SEWAGE AND OTHER CONTAMINATED LIQUIDS WITH RECOVERY OF WATER BY DISTILLATION AND OXIDATION

BACKGROUND OF THE INVENTION

A. Field of the Invention

This invention relates to a one-step process for distillation of water and catalytic oxidation of residues in sewage and other contaminated liquids and, more particularly, distillation and oxidation of contaminated liquids and wet wastes by contacting them with molten salt baths.

B. Description of the Prior Art

The purification of contaminated liquids such as sewage, and of wet wastes such as animal and human wastes, has long been a difficult problem because of the requirement of separating or predrying prior to burning in an incinerator. For example, a typical method employed in agricultural processes for elimination of animal wastes involves predrying of such wastes on conveyor belts passed through drying chambers, a time consuming and very expensive procedure. In many industrial processes, such as textile manufacturing, large volumes of liquid wastes are produced which, if merely dumped into rivers and streams, would cause massive pollution, but which are not suitable for easy elimination due to their wetness. There is thus a long felt and extremely urgent need for an efficient and high capacity process for purification of contaminated liquids.

It has been determined that molten salt baths provide an efficient medium for oxidation of carbonaceous materials, e.g., unburned products of combustion contained in waste gases, when such materials are contacted with the molten salt bath. The bath, when maintained at a temperature below the normal combustion temperature of the pollutants, acts as a catalyst in inducing efficient oxidation of the carbonaceous materials into innocuous species. See copending applications Ser. Nos. 781,495 and 781,383, filed by Jacob Greenberg on Dec. 5, 1968. However, the use of molten salts in the elimination of contaminated liquids having a high water content has not heretofore been investigated. More specifically, there has been no showing in the prior art of any efficient method, using molten salts or otherwise, of burning wastes in the presence of large quantities of water.

SUMMARY OF THE INVENTION

It is an object of this invention to provide a method for efficiently purifying sewage, other contaminated liquids, and wet wastes, which overcomes the prior art requirement of an expensive predrying procedure.

It is a further object of this invention to provide a method for purifying contaminated liquids and wet wastes having a high water content by the combined steps of evaporating the water and oxidizing the residues.

It is a further object of this invention to provide a method for quick and efficient removal of water from liquids.

It is a further object of this invention to provide an efficient method of desalination of salt water.

Accordingly, this invention provides a method for treating wet pollutants having a high water content, in the form of contaminated liquids and wet wastes, comprising the step of introducing such wet pollutants onto the surface of a molten salt bath, which bath is characterized by a relatively low melting temperature and high stability with respect to the wet pollutants and air, and which acts both as an efficient heat transfer mechanism, thereby causing evaporation of the water contained in the wet pollutant, and as a catalyst, thereby inducing oxidation of remaining organic residues. Air is forced across the surface of the bath in order to provide oxygen for combustion, to carry away water vapor, and to promote agitation of the bath and resultant intermixture of the salt with the wet pollutants.

DETAILED DESCRIPTION OF THE INVENTION

Figure 1:
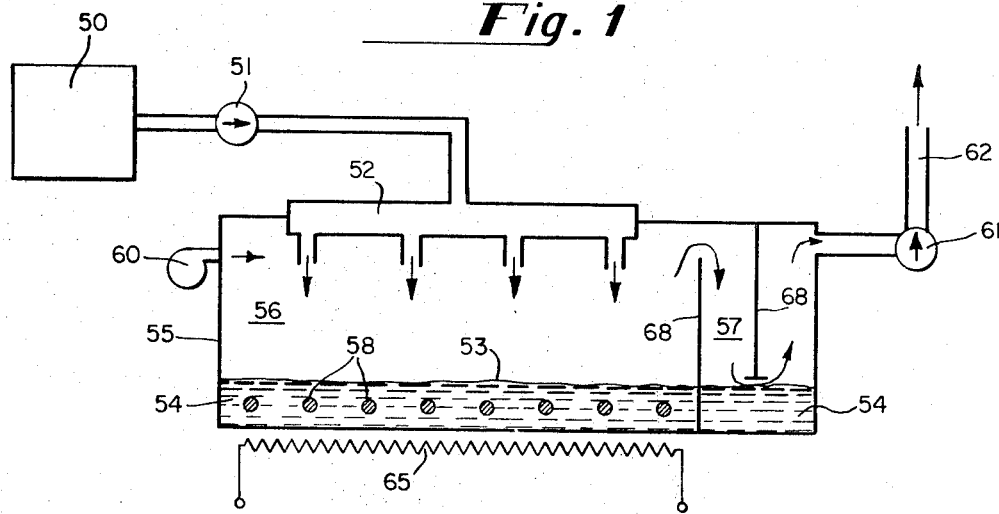
FIG. 1 shows, in schematic form, the components of a sewage purification system suitable for the practice of this invention.

Referring now to FIG. 1, a sewage system is shown comprising a storage tank 50 containing the wet pollutant, in the form of sewage or other contaminated liquid, a conventional pump 51 for controlling the feed of the liquid out of the tank, and a trough 52 having a plurality of outlets through which the contaminated liquid is gravity fed onto the surface 53 of a molten salt bath 54. The molten salt is housed in a container 55 constructed of a suitably noncorrosive material, the container having within it a main chamber 56 where evaporation and combustion of the wet pollutant take place, and an additional baffled chamber 57 where the gases of combustion produced in the main chamber are again brought into contact with the salt in order to further oxidize any incompletely oxidized products. The baffles 68 also prevent salt carry over from the lifting of the bath when the water flash evaporates in chamber 56. A conventional blower mechanism 60 and a negative pressure fan 61 provide a continuous flow of air through the chamber for discharge of all products out of exit channel 62. The capacities of blower 60 and fan 61 are engineering parameters which are determined in accordance with the air flow rate required, which in turn will depend upon the rate of sewage treatment for the unit.

Still referring to FIG. 1, heater units 65 are shown positioned external to the container 55, and are utilized to maintain the salt bath at a desired operating temperature. The heaters may be conventional open flame heaters or electrical heaters, with the heat being transferred through the container 55 to the salt 54. Alternately, as shown at 58, electric or fuel fired immersion heaters, typically 6 inches to 12 inches in diameter, may be immersed within the liquid in order to provide more efficient heat transfer to the bath.

The method of this invention is for the efficient treatment of sewage, wet human wastes, wet animal wastes, and other liquids containing wastes composed of acrylics, other hydrocarbons, organics, carbonaceous materials, and the like. These nonaqueous materials in the liquids will hereinafter be referred to simply as residues. The method also may be utilized in the treatment of sludge produced by conventional water treatment processes, and the treatment of solutions of neutral salts and other residues for quick removal of water.

In the practice of this invention, the contaminated liquid which is to be treated is introduced onto the surface of a bath of molten salt, the contact of the liquid with the hot bath resulting in a flash evaporation of the water, leaving behind the residue which is caused to ignite and decompose extremely rapidly under the catalytic influence of the bath. The procedure is normally a continuous one, with the sewage or other contaminated liquid being continuously fed onto the surface of the bath, water continuously being evaporated from the liquid in the form of steam, and the remaining residues being burned off. In order to provide sufficient oxygen for combustion of the residues, and to remove the water vapor which is produced by the evaporation, air is force-fed across the surface of the molten bath and drawn out on the other side along with the oxidation products and the water vapor, the flow of air also serving to agitate the salt bath and cause intermixing of the contaminated liquid with the bath. It is to be emphasized that the residues burn quickly and vigorously, even in the presence of large amounts of water and steam.

It has been found that in the practice of this invention the size of the bath required is primarily dictated by the heat system utilized. The externally located heaters are the least efficient, being located remotely from the surface where the intended reactions take place, and require transfer of the heat through the container and through the bath itself. For immersion tubes which are normally 6 inches to 12 inches in diameter, it is required that the bath be maintained at a depth sufficient to cover the tubes with salt at all times, whereas the critical reaction surfaces, where vaporization and oxidation take place, extend for only a few millimeters. In order to obviate the requirement of large, heavy and expensive bath systems to accommodate such bulky commercial heaters, and to reduce the heat energy required to maintain the bath in a molten state, the fuel may be burned directly in the bath, as is illustrated schematically in FIG. 2. In order to introduce fuel directly into the bath, along with stoichiometric oxygen, the salt is first melted by heating above the salt surface, as by heater 74, or by initial transfer of heat from external heaters 77. Once the salt melts, fuel and oxygen are forced by a conventional pump 75 through nozzles 78 extending within the bath, the fuel igniting and burning within the liquid and efficiently transferring the heat of combustion to the liquid bath. By burning the fuel directly in the bath instead of using an open flame or electrical immersion means, better heat transfer can be achieved, enabling the use of a minimum amount of salt in order to promote the desired reactions. The combustion gas resulting from the fuel burning, along with the gases and water vapor from the sewage, is drawn, by fan 80, through baffle chamber 81, where it is contacted with the salt, which induces further oxidation of unburned products of combustion.

As the evaporation and oxidation reactions induced by the salt bath occur in a matter of milliseconds, the contaminated liquid may be continuously deposed onto the bath surface, the rate of introducing the liquid being limited only by the surface area of the bath. It has been found that for a bath having a surface of 5 feet × 20 feet, this process completely treats 500 gallons per hour of contaminated liquid or other wet waste, the water being evaporated off and the residues being burned with essentially complete removal of hydrocarbons. The water vapor may, if desired, be distilled to obtain pure water.

In practicing the method of this invention, advantage is taken of the good heat transfer properties of the salt bath. The water, upon coming into contact with the surface of the bath, absorbs the heat which is readily transferred to and through the bath, and is rapidly evaporated, producing steam which rises above the bath surface. At the same time, the hydrocarbons and organics contained in the residues are readily oxidized. These species have 9 finite solubility in the molten salt bath and, in the presence of the bath, oxidize at lower energy levels and lower temperatures than normally required, and with a very small reaction time, i.e., several milliseconds. The operating temperature of the bath may be maintained at a temperature considerably below that ordinarily required for combustion of such residues, indicating that the salt also exerts a catalytic influence in inducing oxidation of the species. As an example of this catalytic property, propane introduced over the surface of a molten salt bath ignites at a temperature about 200° C. below its normal combustion temperature at a corresponding pressure.

The salt bath, therefore, is seen to be an uniquely effective medium in which to both evaporate water and to carry out oxidation reactions of hydrocarbons and other organic residues. The bath is stable in that it possesses the characteristics of a sharp melting point, it does not undergo any substantial change in chemical composition in the presence of ambient air, water vapor, or the residues which are brought into contact with it. The partial pressure, or the vapor pressure above the liquid surface, is minimal and within about 20 millimeters of mercury at operating temperatures, i.e., about 200° F. above the melting point.

In the practice of this invention, the molten salt bath is maintained at a relatively low temperature. For many applications, the bath temperature is maintained at or below 450° C., or about 850° F., this being adequate for substantially complete oxidation of the residues present. The bath may be maintained at a temperature below the normal free-state combustion temperature of the residue due to its catalytic nature. Higher operating temperatures may be utilized in applications where residues are present which require higher temperatures for complete oxidation. It is to be noted that where the oxidation reactions are exothermic, as with hydrocarbons, there will exist localized temperatures, at or near the surface of the salt, in excess of the average operating temperature of the bath.

It should be emphasized that in the practice of this invention the molten salt bath does not directly react with the residues, in that the salt does not undergo any substantial change in chemical composition due to the oxidation of the residues. Rather, the molten salt acts as a catalyst in lowering the heat energy which must be supplied to carry out oxidation, and as a heat transfer medium. The salt does not take part in any net displacement reactions and, accordingly, the oxidation process is carried out without need for regeneration of the salt bath.

The salts which are usable according to this invention are stable at the temperatures required for combustion of the residues and remain substantially chemically unchanged during the oxidation reactions. A first class of such salts which are usable are the neutral salts. While eutectic mixtures of such salts are preferred, as they provide the greatest efficiency of operation at low temperatures, a single neutral salt, or non-eutectic mixtures of such salts, may be utilized. A representative list of some of the neutral baths which may be used in this invention is included below. The temperatures given represent the melting point of the bath, and are accurate to within plus or minus 10° C.; the compositions are accurate to within 10 percent. The baths are examples of eutectic mixtures of neutral salts, where M equals mole throughout.

Mixtures with KCl
41 M% KCl—59 M% LiCl        358° C.
57 M% KCl—43 M% BaCl$_2$    345° C.
60 M% KCl—40 M% CaCl$_2$    580° C.
35 M% KCl—65 M% CdCl$_2$    380° C.
40 M% KCl—60 M% MgCl$_2$    420° C.
55 M% KCl—45 M% SrCl$_2$    575° C.
50 M% KCl—50 M% MnCl$_2$    500° C.
48 M% KCl—52 M% PbCl$_2$    411° C.
45 M% KCl—55 M% ZnCl$_2$    230° C.

Mixtures with LiCl
72 M% LiCl—28 M% NaCl       560° C.
28 M% LiCl—62 M% CaCl$_2$   496° C.
45 M% LiCl—55 M% MnCl$_2$   550° C.
45 M% LiCl—55 M% PbCl$_2$   410° C.
45 M% LiCl—55 M% SrCl$_2$   475° C.

Mixtures with NaCl
33 M% NaCl—67 M% CaCl$_2$   550° C.
42 M% NaCl—58 M% CdCl$_2$   397° C.
48 M% NaCl—52 M% CoCl$_2$   365° C.
60 M% NaCl—40 M% MgCl$_2$   450° C.
55 M% NaCl—45 M% MnCl$_2$   415° C.
45 M% NaCl—55 M% NiCl$_2$   560° C.
28 M% NaCl—72 M% PbCl$_2$   415° C.
50 M% NaCl—50 M% SrCl$_2$   560° C.

Mixtures with BaCl$_2$
12 M% BaCl$_2$—88 M% BeCl$_2$    390° C.
30 M% BaCl$_2$—70 M% CaCl$_2$    600° C.
45 M% BaCl$_2$—55 M% CdCl$_2$    450° C.
35 M% BaCl$_2$—65 M% MgCl$_2$    560° C.
35 M% BaCl$_2$—65 M% MnCl$_2$    500° C.
50 M% BaCl$_2$—50 M% ZnCl$_2$    500° C.

Mixtures with CaCl$_2$
47 M% CaCl$_2$—63 M% MnCl$_2$    600° C.
18 M% CaCl$_2$—82 M% PbCl$_2$    470° C.
50 M% CaCl$_2$—50 M% ZnCl$_2$    600° C.

Mixtures with CdCl$_2$
50 M% CdCl$_2$—50 M% MnCl$_2$    600° C.
35 M% CdCl$_2$—65 M% PbCl$_2$    387° C.
60 M% CdCl$_2$—40 M% SrCl$_2$    500° C.
50 M% CdCl$_2$—50 M% ZnCl$_2$    500° C.

Mixtures with ZnCl₂
- 38 M% ZnCl₂—62 M% SnCl₂ — 180° C.
- 45 M% ZnCl₂—55 M% SrCl₂ — 480° C.

Mixtures with MgCl₂
- 8 M% MgCl₂—92 M% PbCl₂ — 460° C.
- 55 M% MgCl₂—45 M% SrCl₂ — 530° C.

Mixtures with PbCl₂
- 20 M% BaCl₂—80 M% PbCl₂ — 505° C.
- 48 M% BeCl₂—52 M% PbCl₂ — 300° C.
- 90 M% BiCl₃—10 M% PbCl₂ — 205° C.
- 18 M% CaCl₂—82 M% PbCl₂ — 460° C.
- 35 M% CdCl₂—65 M% PbCl₂ — 387° C.
- 33 M% CuCl—67 M% PbCl₂ — 285° C.
- 50 M% FeCl₂—50 M% PbCl₂ — 185° C.
- 48 M% KCl—52 M% PbCl₂ — 411° C.
- 45 M% LiCl—55 M% PbCl₂ — 410° C.
- 8 M% MgCl₂—92 M% PbCl₂ — 450° C.
- 30 M% MnCl₂—70 M% PbCl₂ — 405° C.
- 28 M% NaCl—72 M% PbCl₂ — 415° C.
- 72 M% PbF₂—28 M% PbCl₂ — 550° C.
- 76 M% PbI₂—24 M% PbCl₂ — 310° C.
- 50 M% SnCl₂—50 M% PbCl₂ — 410° C.
- 60 M% TlCl—40 M% PbCl₂ — 390° C.
- 50 M% ZnCl₂—50 M% PbCl₂ — 340° C.

Mixtures with 3 Chlorides
- 35 M% PbCl₂—35 M% KCl—30 M% CdCl₂ — 328° C.
- 60 M% KCl—20 M% PbCl₂—20 M% NaCl — 500° C.
- 10 M% PbCl₂—50 M% KCl—40 M% ZnCl₂ — 280° C.
- 10 M% NaCl—40 M% LiCl—50 M% KCl — 400° C.
- 70 M% LiCl—15 M% CaCl₂—15 M% KCl — 450° C.
- 30 M% BaCl₂—35 M% KCl—35 M% NaCl — 542° C.
- 10 M% NaCl—35 M% CaCl₂—55 M% KCl — 600° C.
- 15 M% NaCl—50 M% CdCl₂—35 M% KCl — 450° C.
- 10 M% NaCl—15 M% PbCl—75 M% KCl — 500° C.

Mixtures with KBr
- 31 M% KBr—69 M% LiBr — 310° C.
- 60 M% KBr—40 M% CdBr₂ — 325° C.
- 32 M% KBr—68 M% MgBr₂ — 350° C.
- 50 M% KBr—50 M% SrBr₂ — 525° C.

Mixtures with NaBr
- 40 M% BaBr₂—60 M% NaBr — 600° C.
- 60 M% CaBr₂—40 M% NaBr — 510° C.
- 45 M% CdBr₂—55 M% NaBr — 370° C.
- 40 M% MgBr₂—60 M% NaBr — 425° C.
- 60 M% SrBr₂—40 M% NaBr — 480° C.

Mixtures with LiBr
- 80 M% LiBr—20 M% NaBr — 525° C.
- 75 M% LiBr—25 M% BaBr₂ — 485° C.
- 32 M% LiBr—68 M% SrBr₂ — 460° C.

Mixtures with PbBr₂
- 80 M% BiBr₃—20 M% PbBr₂ — 200° C.
- 18 M% CdBr₂—82 M% PbBr₂ — 344° C.
- 90 M% HgBr₂—10 M% PbBr₂ — 208° C.
- 50 M% PbCl₂—50 M% PbBr₂ — 425° C.
- 78 M% PbF₂—22 M% PbBr₂ — 520° C.
- 10 M% PbF₂—90 M% PbBr₂ — 350° C.
- 44 M% PbI₂—56 M% PbBr₂ — 282° C.

Mixtures with 3 Bromides
- 12.5 M% NaBr  12.5 M% CdBr₂  75 M% PbBr₂ — 280° C.
- 65 M% PbI₂  18 M% PbCl₂  17 M% PbBr₂ — 300° C.

Mixtures with 4 salts: °C.
- 25 M% ClCl₂, 25 M% CdBr₂, 25 M% PbCl₂, 25 M% PbBr₂ — 450
- 10 M% NaCl, 10 M% NaBr, 60 M% PbCl₂, 20 M% PbBr₂ — 450
- 10 M% NaCl, 10 M% NaI, 40% PbCl₂, 40 M% PbI₂ — 365

In addition, any neutral salt may be used by itself, e.g., LiBr (547° C.), LiI (446° C.), and CaI₂ (575° C.). It is also reemphasized that other than eutectic mixtures can be used, the eutectic mixtures being preferred but not exclusive.

A second class of usable salts is that of chemically active salts comprising chemical oxidizers. The baths of chemical oxidizers possess the property of releasing nascent oxygen when raised to temperatures approximately 200° F. or more above their melting points, and also behave catalytically as do the neutral salts. Such oxidizing salt mixtures generally have lower melting temperatures than the neutral salt baths and, accordingly, are useful in any application utilizing conventional heating methods where it is desirable to keep the operating temperature of the bath as low as possible. Such oxidizing salts may be used as inert baths at temperatures below 200° F. above their melting points, to permit operation at temperatures where the exothermic oxidation reactions are not in danger of producing an explosive situation. A representative list of some of the chemical oxidizers which may be used in the practice of the method of this invention is found below. It is to be noted that any combination of neutral and active salts, eutectic or noneutectic, may be utilized. The temperatures given represent the lowest temperature at which the melt may be used, and are accurate to within 10° C. M% again indicates mole percentage, accurate to within 10 percent.

Chemical Oxidizers

Oxides
- 2 M% K₂CrO₄  98 M% K₂Cr₂O₇ — 398° C.
- 45 M% MoO₃  55 M% K₂MoO₄ — 470° C.
- 43 M% WO₃  57 M% K₂WO₄ — 600° C.
- 47 M% MoO₃  53 M% Li₂MoO₄ — 530° C.
- 45 M% 3Na₂O·As₂O₅  55 M% As₂O₅ — 570° C.
- 77 M% MoO₃  33 M% Na₂MoO₄ — 510° C.
- 58 M% 3Na₂O·P₂O₅  42 M% Na₂O·P₂O₅ — 552° C.
- 38 M% WO₃  62 M% Rb₂WO₄ — 570° C.
- 8 M% CaO  92 M% P₂O₅ — 409° C.
- 50 M% PbO  50 M% V₂O₅ — 480° C.

Three Oxides
- 37 M% K₂MO₄ (= K₂O+MoO₃)— 63 M% Li₂MoO₄ — 525° C.
- 50 M% KPO₃—50 M% LiPO₃
  (consists of K₂O,Li₂O,P₂O₅) — 562° C.
- 49 M% NaPO₃—49 M% KPO₃—2 M% K₂O — 547° C.
- 50 M% Li₂MoO₄—50 M% Na₂MoO₄ — 465° C.
- 50 M% Na₂WO₄—50 M% Li₂WO₄ — 500° C.
- 50 M% Pb₂SiO₄—50 M% Na₂SiO₃ — 600° C.
- 33 M% Na₂O·SiO₂—67 M% PbO·SiO₂ — 580° C.

Perchlorates
- 70 M% LiClO₄  30 M% NH₄ClO₄ — 185° C.
- 40 M% NaClO₄  60 M% Ba(ClO₄)₂ — 305° C.

Hydroxides
- 50 M% NaNO₂  50 M% NaOH — 270° C.
- 50 M% KNO₂  50 M% KOH — 200° C.
- 50 M% KOH  50 M% KNO₃ — 235° C.
- 70 M% KOH  30 M% LiOH — 110° C.
- 50 M% KOH  50 M% KNO₃ — 240° C.
- 50 M% KOH  50 M% NaOH — 170° C.
- 15 M% K₂CrO₄  85 M% KOH — 361° C.
- 70 M% NaOH  30 M% LiOH — 210° C.
- 50 M% NaOH  50 M% NaNO₂ — 266° C.
- 50 M% KNO₃  50 M% NaOH — 330° C.
- 62 M% Ba(OH)₂  38 M% Sr(OH)₂ — 360° C.
- 30 M% KOH  30 M% NaOH —
- 33 M% NaOH  40 M% LiOH — 300° C.
- 25 M% LiOH  34 M% Na₂SO₄—33 M% NaCl — 500° C.
- 25 M% NaOH—25 M% Li₂CrO₄—25 M% Na₂CrO₄ — 475° C.
- 25 M% LiOH  25 M% NaOH—25 M% LiNO₃—25 M% NaNO₃ — 400° C.

Nitrates
- 50 M% KNO₃  50 M% NaNO₃ — 222° C.
- 35 M% KNO₃  65 M% TlNO₃ — 185° C.
- 85 M% KNO₃  15 M% Ba(NO₃)₂ — 280° C.
- 50 M% Ca(NO₃)₂  50 M% NaNO₃ — 240° C.
- 50 M% Ca(NO₃)₂  50 M% KNO₃ — 240° C.
- 50 M% LiNO₃  50 M% Ba(NO₃)₂ — 400° C.
- 70 M% LiNO₃  30 M% Ca(NO₃)₂ — 240° C.
- 50 M% Ba(NO₃)₂  50 M% Ca(NO₃)₂ — 520° C.
- 60 M% Tl(NO₃)₂  40 M% Ca(NO₃)₂ — 140° C.
- 40 M% KNO₃  35 M% LiNO₃—

| | | |
|---|---|---|
| 60 M% $KNO_3$ | 25 M% $NaNO_3$ | 130° C. |
| | 25 M% $LiNO_3$— | |
| 20 M% $LiNO_3$ 60 M% $Cd(NO_3)_2$— | 15 M% $Ca(NO_3)_2$ | 125° C. |
| | 20 M% $KNO_3$ | 140° C. |
| 34 M% $Ba(NO_3)_2$ | 33 M% $KNO_3$— | |
| | 33 M% $NaNO_3$ | 450° C. |
| 34 M% $Ca(NO_3)_2$ | 33 M% $KNO_3$— | |
| | 33 M% $NaNO_3$ | 140° C. |
| 34 M% $Cd(NO_3)_2$ | 33 M% $NaNO_2$— | |
| | 33 M% $LiNO_3$ | 176° C. |
| 5 M% $Na_2SO_4$ | 95 M% $NaNO_3$ | 300° C. |
| Nitrites | | |
| 70 M% $NaNO_2$ | 30 M% $KNO_2$ | 230° C. |
| Nitrates–Nitrites | | |
| 50 M% $KNO_3$ | 50 M% $KNO_3$ | 350° C. |
| 62 M% $KNO_2$ | 38 M% $Ca(NO_3)_2$ | 140° C. |
| 50 M% $NaNO_2$ | 50 M% $KNO_3$ | 150° C. |
| 50 M% $NaNO_2$ | 50 M% $NaNO_3$ | 230° C. |
| 50 M% $NaNO_2$ | 50 M% $Ca(NO_3)_2$ | 190° C. |
| 25 M% $KNO_2$ | 25 M% $NaNO_2$— | |
| | 25 M% $KNO_3$— | |
| | 25 M% $NaNO_3$ | 150° C. |
| 25 M% $KNO_2$ | 25 M% $Ba(NO_2)_2$— | |
| | 25 M% $KNO_3$— | |
| | 25 M% $Ba(NO_3)_2$ | 300° C. |
| Sulfates | | |
| 60 M% $K_2SO_4$ | 40 M% $CoSO_4$ | 540° C. |
| 55 M% $K_2SO_4$ | 45 M% $CuSO_4$ | 460° C. |
| 55 M% $Li_2SO_4$ | 45 M% $CdSO_4$ | 575° C. |
| 60 M% $Li_2SO_4$ | 40 M% $CoSO_4$ | 600° C. |
| 35 M% $MnSO_4$ | 65 M% $Li_2SO_4$ | 600° C. |
| 50 M% $Na_2SO_4$ | 50 M% $CoSO_4$ | 600° C. |
| 55 M% $Na_2SO_4$ | 45 M% $CuSO_4$ | 500° C. |
| 50 M% $ZnSO_4$ | 50 M% $Na_2SO_4$ | 500° C. |
| Sulfate Mixtures | | |
| 33 M% $K_2SO_4$ | 67 M% $Li(PO_3)_2$ | 470° C. |
| 25 M% $K_2SO_4$ | 25 M% $Li_2SO_4$— | |
| | 25 M% $KNO_3$— | |
| | 25 M% $LiNO_3$ | 460° C. |
| 25 M% $K_2SO_4$ | 25 M% $Li_2SO_4$— | |
| | 25 M% $K_2WO_4$— | |
| | 25 M% $Li_2WO_4$ | 570° C. |
| 25 M% $Li_2SO_4$ | 25 M% $Na_2SO_4$— | |
| | 25 M% $Li_2MoO_4$— | |
| | 25 M% $Na_2MoO_4$ | 520° C. |

It is to be noted that some of the above mixtures are combinations of neutral and active salts, as defined hereinabove. It is again emphasized that these lists are illustrative, and not limiting. Any combinations of neutral and active salts, eutectic or noneutectic, may be utilized.

Figure 2:
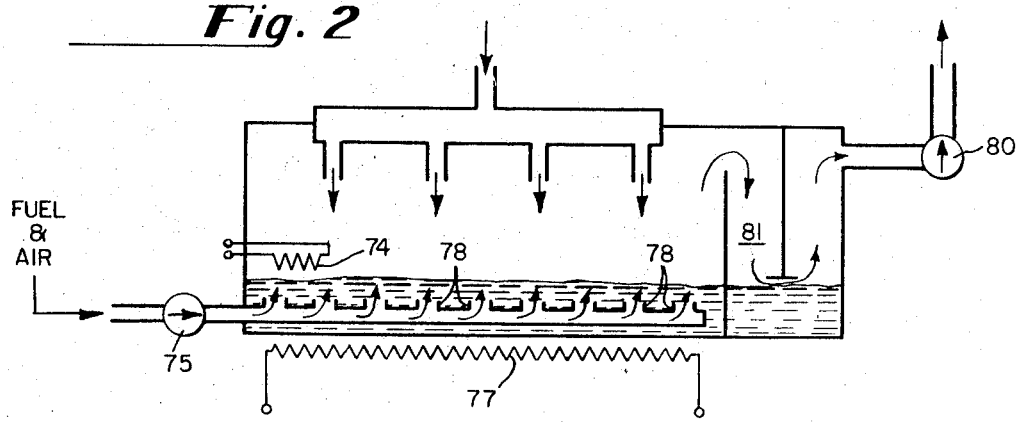
FIG. 2 shows, in schematic form, apparatus for the practice of this invention wherein fuel is introduced and burned within a molten salt bath.
Figure 3:
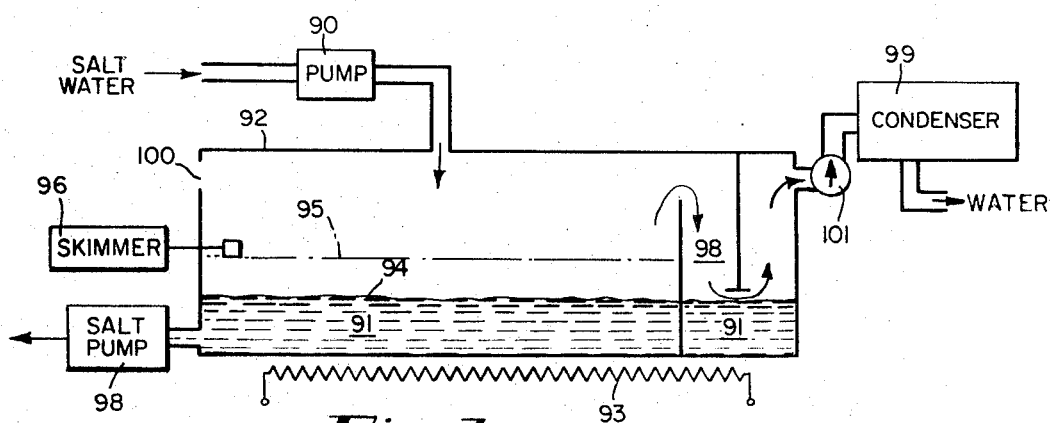
FIG. 3 shows, in schematic form, apparatus for desalination of salt water.

The heat transfer properties of the molten salt baths, as described above, may also be taken advantage of in practicing the operation of quickly removing water from any liquid containing nonaqueous residues. Where the liquid contains only a salty residue, no combustion takes place, but the residue remains after the water is steamed off, adding to the salt bath without impairment of the heat transfer property of the bath. Specifically, desalination of salt water may be achieved by introducing salt water onto the surface of the molten bath in the same manner as described above for treatment of contaminated liquids containing residues. As illustrated in FIG. 3, the salt water, or sea water, may be continuously introduced through a pump 90, the salt bath 91 in a container 92 acting as an extremely efficient heat transfer medium and causing very quick evaporation of the water content. The salt residue simply builds up, as from level 94 to level 95, and adds to the initial salt bath, the additional salt similarly acting as a heat transfer medium. The heat source 93 may be external to container 92 or may be placed within the salt bath, as by the immersion heaters 58 illustrated in FIG. 1, or may be provided by combustion of fuel within the salt bath itself, as illustrated in FIG. 2. Under either condition, the buildup of salt will not affect the mechanism of evaporating the water, as the salt is an excellent heat transfer medium, particularly as compared to metal plates or similar structures conventionally used in desalination processes. In operation, the water simply steams off, and is collected and condensed by conventional means to obtain potable water. The salt which accumulates may be periodically skimmed off by a skimmer 96 or continuously carried off, maintaining the desired level of the salt bath. As an alternate method, the liquid salt may be pumped out at the bottom by pump 98, either continuously or periodically, depending upon the monitored level of the accumulated salt bath. However, the important feature of the method is that the accumulating salt is not a contaminant but may remain to participate in the desalination of further incoming salt water. The water vapor is drawn off by air entering through inlet 100 and pulled out by fan 101.

In practice of the desalination embodiment of this invention, as described above, the fuel may be burned within the salt bath in order to maintain the bath at the desired operating temperature. The simple baffle chamber 98 illustrated in FIG. 3 is utilized in order to contact any incompletely burned fuel products with the bath, thereby inducing further oxidation of same. At the output of the bath container, a condenser 99 or other chilling means may be utilized to convert the steam into water of potable quality.

The following examples further illustrate the invention:

EXAMPLE 1: TEXTILE MANUFACTURING WASTES

In the purification of textile manufacturing wastes having a residue of acrylics, apparatus as shown in FIG. 1 is utilized. The waste, in liquid form, is fed in at a rate of about 500 gallons per hour and gravity fed onto the surface of a bath composed of 60 M% $KNO_2$–38 M% $Ca(NO_3)_2$. The bath has a melting temperature of about 140° C. and is maintained at an operating temperature of about 450° C., or 850° F. The bath is maintained at this temperature to accomplish flash evaporation of the water contained in the waste, no water remaining in the bath under these operating conditions. The bath has a contact surface of about 5 feet × 20 feet, sufficient to accommodate the feed rate of about 500 gallons per hour. The bath is maintained at about a 2-inch depth, and is heated by external open gas flame.

Air is provided, at a flow rate of 50 to 100 c.f.m., a steady flow being maintained by a blower at the input and a pump at the output, as shown in FIG. 1. The output, in addition to the air, contains water vapor and carbon dioxide, there being no measurable hydrocarbons or carbon monoxide in the output.

EXAMPLE 2: TREATMENT OF WET WASTES

Wet cow, chicken and human wastes, at dilutions from 1 percent by weight to over 50 percent by weight, have been burned in oxidizing baths. The following nitrate oxidizing baths have been used:

| | | |
|---|---|---|
| Example 2(a) | 50 M% $Ca(NO_3)_2$— | 50 M% $NaNO_3$. |
| Example 2(b) | 50 M% $Ca(NO_3)_2$— | 50 M% $KNO_3$. |
| Example 2(c) | 34 M% $Ca(NO_3)_2$— | 33 M% $KNO_3$— |
| | | 33 M% $NaNO_3$. |
| Example 2(d) | 25 M% $NaNO_2$— | 25 M% $KNO_3$— |
| | 25 M% $NaNO_3$— | 25 M% $KNO_3$. |

The above baths have melting temperatures of about 275° F. and were operated within the range of 750°–850° F. The waste was introduced from a trough as illustrated in FIG. 1 into a main bath chamber, and the resulting smoke and vapor passed through an end baffle chamber for further purification of the smoke, particularly to eliminate any residual odors. All other operating conditions were as set forth in example 1. The resulting output, during the burning of the cow, chicken and human wastes respectively, was comprised of water vapor and $CO_2$, with no measurable carbon monoxide. No detectable residue remained in the bath, there being complete elimination of the wet wastes.

EXAMPLE 3: HOME SEWAGE TREATMENT

A home sewage unit, for incinerating human wastes, may utilize the same type of sewage trough as shown in FIG. 1. The size of the bath depends upon the desired feed rate, a bath surface of 0.2 square feet per gallon per hour of feed being required. Heating of the salt bath may preferably be accomplished by electric immersion heaters. The same salt baths as used in Example 2 may be used for home sewage treatment, with substantially the same operating conditions.

EXAMPLE 4: SALT WATER DESALINATION

Desalination of salt water is accomplished utilizing the apparatus as illustrated in FIG. 3. The salt water is introduced at a rate dependent upon the area of the salt bath surface and the operating temperature of the bath, a high rate of distillation being possible with higher operating temperatures. Evaporation is achieved through the heat transfer mechanism of the salt bath, the water vapor being drawn out through a suitable negative pressure fan. The following baths are suitable for use in desalination:

| | | |
|---|---|---|
| Example 4(a) | 50 M% Ca(NO$_3$)$_2$— | 50 M% NaNO$_3$. |
| Example 4(b) | 50 M% Ca(NO$_3$)$_2$— | 50 M% KNO$_3$. |
| Example 4(c) | 34 M% Ca(NO$_3$)$_2$— | 33 M% KNO$_3$— |
| | | 33 M% NaNO$_3$. |
| Example 4(d) | 25 M% NaNO$_2$— | 25 M% KNO$_2$— |
| | 25 M% NaNO$_3$— | 25 M% KNO$_3$. |

Baths 4(a)–4(d) have a melting temperature of about 275° F., and are operated at a temperature in the range of 750°–850° F. The surface area of the bath is about 0.2 square feet per gallon per hour of salt water.

Example 4(e). A bath of 57 M% KCl–43 M% BaCl$_2$, having a melting temperature of about 650° F., is maintained at an operating temperature in the range of 1,150°–1,300° F. At this temperature, a surface area of 0.1 square feet per gallon per hour of bath is needed.

Example 4(f). A bath of 41 M% KCl–59 M% LiCl, having a melting temperature of about 675° F., is maintained at an operating temperature within the range of 1,000°–1,150° F. A surface area of 0.1 square feet per gallon per hour is required.

For baths 4(a)–4(f), the water is evaporated off, and the water vapor discharged at a temperature within the range of 250°–400° F.

We claim:

1. A method for elimination of wet organic wastes containing a high water content, comprising the steps of introducing said wet organic wastes onto the surface of a molten salt bath maintained at a temperature below the normal combustion temperature of said wet organic wastes, said molten bath being comprised of a salt or salts and having the property of catalytically inducing oxidation of said organic wet wastes, and providing oxygen at said surface, the salt bath causing evaporation of the water content and catalytically inducing oxidation of the organic wastes.

2. The method defined in claim 1 comprising:
   a. heating said salt bath to maintain it at said temperature; and
   b. forcing a flow of air across said surface, the forced air intermixing said wet wastes with said salt bath and carrying away the water vapor and products of oxidation.

3. The method as defined in claim 2 wherein said heating of said salt bath comprises introducing fuel and oxygen within said salt bath where it ignites and burns.

4. The method defined in claim 2 wherein said salt bath is comprised of a neutral salt.

5. The method defined in claim 2 wherein said salt bath is comprised of a chemically active salt.

6. The method defined in claim 2 comprising the step of condensing said evaporated water.

7. The method defined in claim 3 wherein said air, said water vapor, and combustion gas produced by the burned fuel are drawn away from the surface of said bath under a suction pressure.

8. The method defined in claim 2 comprising the step of passing said air with said water vapor and products of combustion through a baffle chamber where it is contacted with said molten salt bath to further oxidize remaining gases of combustion.

9. The method defined in claim 2 wherein said wastes comprise acrylics.

10. The method defined in claim 2 wherein said wastes comprise animal wastes.

11. A method for treatment of wet organic waste matter, through the combined operations of evaporating the water and oxidizing the organic waste matter, comprising:
    a. heating and maintaining a salt bath in a molten state, said bath being comprised of a salt or salts and having the property of catalytically inducing oxidation of said organic waste matter;
    b. passing air over the surface of said bath; and
    c. introducing said wet organic waste matter onto the surface of said molten salt bath, said salt bath causing evaporation of the water from said wet waste matter and catalytically inducing oxidation of the organic waste matter.

12. The method as described in claim 11, wherein said wet organic waste matter is contained in a liquid having a high content of water and wherein said salt bath causes evaporation of the water content and catalytically induces combustion of said organic waste matter, and the evaporated water and the products of such combustion are carried away from said surface.

13. The method as described in claim 12 wherein said molten bath is maintained at an average operating temperature at or below 450° C.

14. The method as described in claim 13 comprising the step of forcing air over the surface of said bath to agitate the bath, to aid in oxidation of the organic waste matter, and to carry away said evaporated water and products of combustion.

15. The method defined in claim 12 wherein said bath is maintained at a temperature below the normal combustion temperature of the organic waste matter, the salt bath transferring heat to said liquid to vaporize the water content into steam, and the catalytic property of the bath inducing combustion of the organic waste matter at a temperature below its normal combustion temperature.

16. The method defined in claim 15, wherein said waste matter is continuously introduced onto the surface of said molten salt bath.

* * * * *

UNITED STATES PATENT OFFICE
CERTIFICATE OF CORRECTION

PO-1050
(5/69)

Patent No. 3,642,583                    Dated    February 15, 1972

Inventor(s)  Jacob Greenberg and Douglas C. Whitaker

It is certified that error appears in the above-identified patent and that said Letters Patent are hereby corrected as shown below:

Column 3, line 33, "deposed" should be --deposited--.

Column 5, lines 25 to 33,

"35 M% $PbCl_2$ - 35 M% KCl  - 30 M% Cd    $Cl_2$   328°C
60 M% KCl    - 20 M% $PbCl_2$ - 20 M% Na   $Cl_2$   500°C
10 M% $PbCl_2$ - 50 M% KCl   - 40 M% Zn    $Cl_2$   280°C
10 M% NaCl   - 40 M% LiCl   - 50 M% KC    $l_2$    400°C
70 M% LiCl   - 15 M% $CaCl_2$ - 15 M% K     Cl     450°C
30 M% $BaCl_2$ - 35 M% KCl   - 35 M% Na    Cl     542°C
10 M% NaCl   - 35 M% $CaCl_2$ - 55 M% K     Cl     600°C
15 M% NaCl   - 50 M% $CdCl_2$ - 35 M% K     Cl     450°C
10 M% NaCl   - 15 M% $PbCl_2$ - 75 M% K     Cl     500°C", should be --35 M% $PbCl_2$ - 35 M% KCl  - 30 M% $CdCl_2$    328°C
60 M% KCl    - 20 M% $PbCl_2$ - 20 M% $NaCl_2$    500°C
10 M% $PbCl_2$ - 50 M% KCl   - 40 M% $ZnCl_2$    280°C
10 M% NaCl   - 40 M% LiCl   - 50 M% $KCl_2$     400°C
70 M% LiCl   - 15 M% $CaCl_2$ - 15 M% KCl       450°C
30 M% $BaCl_2$ - 35 M% KCl   - 35 M% NaCl       542°C
10 M% NaCl   - 35 M% $CaCl_2$ - 55 M% KCl       600°C
15 M% NaCl   - 50 M% $CdCl_2$ - 35 M% KCl       450°C
10 M% NaCl   - 15 M% $PbCl_2$ - 75 M% KCl       500°C--.

Column 5, line 59, "M% $PbBr_2$    17", should be --17 M% $PbBr_2$--.

Signed and sealed this 20th day of June 1972.

(SEAL)
Attest:

EDWARD M. FLETCHER, JR.           ROBERT GOTTSCHALK
Attesting Officer                 Commissioner of Patents